US009684400B2

(12) United States Patent
Liu

(10) Patent No.: US 9,684,400 B2
(45) Date of Patent: Jun. 20, 2017

(54) CAPACITIVE SENSING DETECTION METHOD FOR AN ACTIVE PIXEL MATRIX

(71) Applicant: Hung-Ta Liu, Hsinchu County (TW)

(72) Inventor: Hung-Ta Liu, Hsinchu County (TW)

( * ) Notice: Subject to any disclaimer, the term of this patent is extended or adjusted under 35 U.S.C. 154(b) by 0 days.

(21) Appl. No.: 13/872,161

(22) Filed: Apr. 29, 2013

(65) Prior Publication Data

US 2013/0314369 A1 Nov. 28, 2013

(30) Foreign Application Priority Data

May 23, 2012 (TW) ............... 101118354 A

(51) Int. Cl.
G06F 3/041 (2006.01)
G06F 3/044 (2006.01)

(52) U.S. Cl.
CPC ............ *G06F 3/0412* (2013.01); *G06F 3/044* (2013.01); *G06F 3/0416* (2013.01)

(58) Field of Classification Search
None
See application file for complete search history.

(56) References Cited

U.S. PATENT DOCUMENTS 8,040,326 B2 * 10/2011 Hotelling et al. ............ 345/173
2006/0256093 A1 * 11/2006 Furukawa ............. G06F 3/0412
345/173
2008/0018575 A1 * 1/2008 Kobayashi ........... G02B 6/0076
345/87
2008/0309627 A1 * 12/2008 Hotelling ........... G02F 1/134363
345/173
2010/0127993 A1 5/2010 Wang et al.
2010/0194707 A1 * 8/2010 Hotelling .............. G06F 3/0412
345/173
2010/0214248 A1 * 8/2010 Takano et al. ................ 345/173

FOREIGN PATENT DOCUMENTS

| CN | 1839368 A | 9/2006 |
|---|---|---|
| CN | 101866228 A | 10/2010 |
| CN | 102455536 A | 5/2012 |
| JP | 2010176137 A | 8/2010 |
| JP | 2010198388 A | 9/2010 |
| JP | 2013171369 A | 9/2013 |
| KR | 101074800 B1 | 10/2011 |
| KR | 20110122726 A | 11/2011 |
| KR | 20120045992 A | 5/2012 |
| TW | 201122977 A1 | 7/2011 |
| TW | 201211864 A1 | 3/2012 |
| WO | 2008157249 A1 | 12/2008 |

* cited by examiner

Primary Examiner — Seokyun Moon
Assistant Examiner — Peijie Shen
(74) Attorney, Agent, or Firm — CKC & Partners Co., Ltd.

(57) ABSTRACT

The present invention provides a capacitive sensing detection method for an active pixel matrix. The method comprises to select a first sensing region in the active pixel matrix. Then, a first signal is transferred to the first sensing region. Next, a second sensing region is selected. A second signal is transferred to the second sensing region for sensing. Finally, a change of the first signal and the second signal is detected and calculated to determine a position.

15 Claims, 7 Drawing Sheets

CAPACITIVE SENSING DETECTION METHOD FOR AN ACTIVE PIXEL MATRIX

RELATED APPLICATIONS

This application claims priority to Taiwanese Application Serial Number 10118354, filed May 23, 2012 which is herein incorporated by reference.

BACKGROUND

Field of Invention

The present invention relates to a detection method, and more particularly to a capacitive sensing detection method.

Description of Related Art

Touch sensing technology capable of providing a natural interface between an electronic system and user has found widespread applications in a variety of fields, for example, in mobile phones, personal digital assistants (PDAs), automatic teller machines (ATMs), game machines, medical devices, liquid crystal display (LCD) devices, computing devices, and the like, where a user may input desired information and/or operate the electronic system through a touch sensing device associated with the electronic system.

There are different types of touch sensing devices available for detection of a touch position. One is a resistive-type touch sensing device that includes two layers of transparent conductive material, such as a transparent conductive oxide, separated by a gap. When touched with sufficient force, one of the conductive layers flexes to make contact with the other conductive layer. The position of the contact point is detectable by a controller that senses the change in resistance at the contact point. In response, the controller performs a function, if any, associated with the contact point.

Another one is a capacitive-type touch sensing device. The capacitive-type touch sensing device can be classified into two types: an analog capacitive sensing device, which uses a contiguous resistive layer, and a mutual-type projected capacitive sensing device, which uses patterned conductive layers (electrodes).

In a projected capacitive touch device, the touch sensor employs a series of patterned electrodes that are driven with a signal from a controller. Similarly, a touch position of the contact point can be derived from currents flowing through one or more corresponding electrodes toward the touch point responsive to the touch with sensing the capacitance induced by a user's finger. A finger touch to the sensor provides a capacitive couple from the conductive layer to the body. The touch position of the contact point is detectable by a controller that measures a change in a capacitively coupled electrical signal at the touch position. Accordingly, the controller performs a function, if any, associated with the touch position.

Typically, a touch panel using the capacitive touch sensing detection has those advantages including waterproof, anti scratch and high rate of transmission. Moreover, it is also very convenient for a user to use his finger to control this kind of touch panel. However, an additional touch panel is needed to detect the touch position. The touch panel and the pixel matrix are stacked together, which increases the thickness of the display. Therefore, a new capacitive sensing detection method that can be directly performed in the pixel matrix is required.

SUMMARY

An object of the present invention is to provide a capacitive sensing method that is performed in a pixel matrix.

The present invention provides a capacitive sensing detection method for an active pixel matrix. The method comprises to select a first sensing region in the active pixel matrix. Then, a first signal is transferred to the first sensing region. Next, a second sensing region is selected. A second signal is transferred to the second sensing region for sensing. Finally, a change of the first signal and the second signal is detected and calculated to determine a position.

In an embodiment, the first sensing region comprises a pixel, a pixel segment, a conductive line or a plurality of conductive lines.

In an embodiment, the second sensing region comprises a pixel, a pixel segment, a conductive line or a plurality of conductive lines.

In an embodiment, the second sensing region overlaps the first sensing region, or the second sensing region is adjacent the first sensing region, or the second sensing region separates from the first sensing region.

In an embodiment, the method further comprises transferring a pulse signal or a high-level voltage signal to the first sensing region before transferring a first signal to the first sensing region.

In an embodiment, the method further comprises transferring a pulse signal or a high-level voltage signal to the second sensing region before transferring and calculating a second signal to the second sensing region.

In an embodiment, the method further comprises discharging the first sensing region before transferring and a first signal to the first sensing region.

In an embodiment, the method further comprises discharging the second sensing region before transferring and calculating a second signal to the second sensing region.

In an embodiment, the first sensing region or the second sensing region further comprises the data lines, the scan lines, the power lines, the Bias lines, the common electrode lines, the reading lines and the control lines of a display.

In an embodiment, the active pixel matrix is disposed in a display.

In an embodiment, the display is an Organic Light Emitting Display, a thin film transistor liquid crystal display, an Electrode Wetting display, an electrophoretic display, a Microelectromechanical Systems (MEMS) display or an optical mode interference MEMS display.

In an embodiment, the display further comprises a backlight module. The above capacitive sensing detection method is performed when the backlight module is turned off.

In an embodiment, the display further comprises a front light module. The above capacitive sensing detection method is performed when the front light module is turned off.

In an embodiment, the display further comprises a backlight module. The above capacitive sensing detection method is performed in a region of the active pixel matrix that is not lighted by the backlight module.

In an embodiment, the display further comprises a front light module. The above capacitive sensing detection method is performed in a region of the active pixel matrix that is not lighted by the front light module.

The present invention also provides an integrated circuit disposed in an active pixel matrix for performing a capacitive sensing detection method. The capacitive sensing detection method comprises to select a first sensing region in the active pixel matrix. Then, a first signal is transferred to the first sensing region. Next, a second sensing region is selected. A second signal is transferred to the second sensing region for sensing. Finally, a change of the first signal and the second signal is detected and calculated to determine a position.

Accordingly, the scan lines and the data lines are used as the sensing matrix to perform the capacitive sensing detection. In other words, there is no additional sensing panel needed. The thickness of the display is reduced. Moreover, the thin film transistor of the pixel matrix is used to select the sensing electrodes. Therefore, the array substrate may be manufactured using a standard manufacturing process.

BRIEF DESCRIPTION OF THE DRAWINGS

In order to make the foregoing as well as other aspects, features, advantages, and embodiments of the present invention more apparent, the accompanying drawings are described as follows.

DETAILED DESCRIPTION

Figure 1:
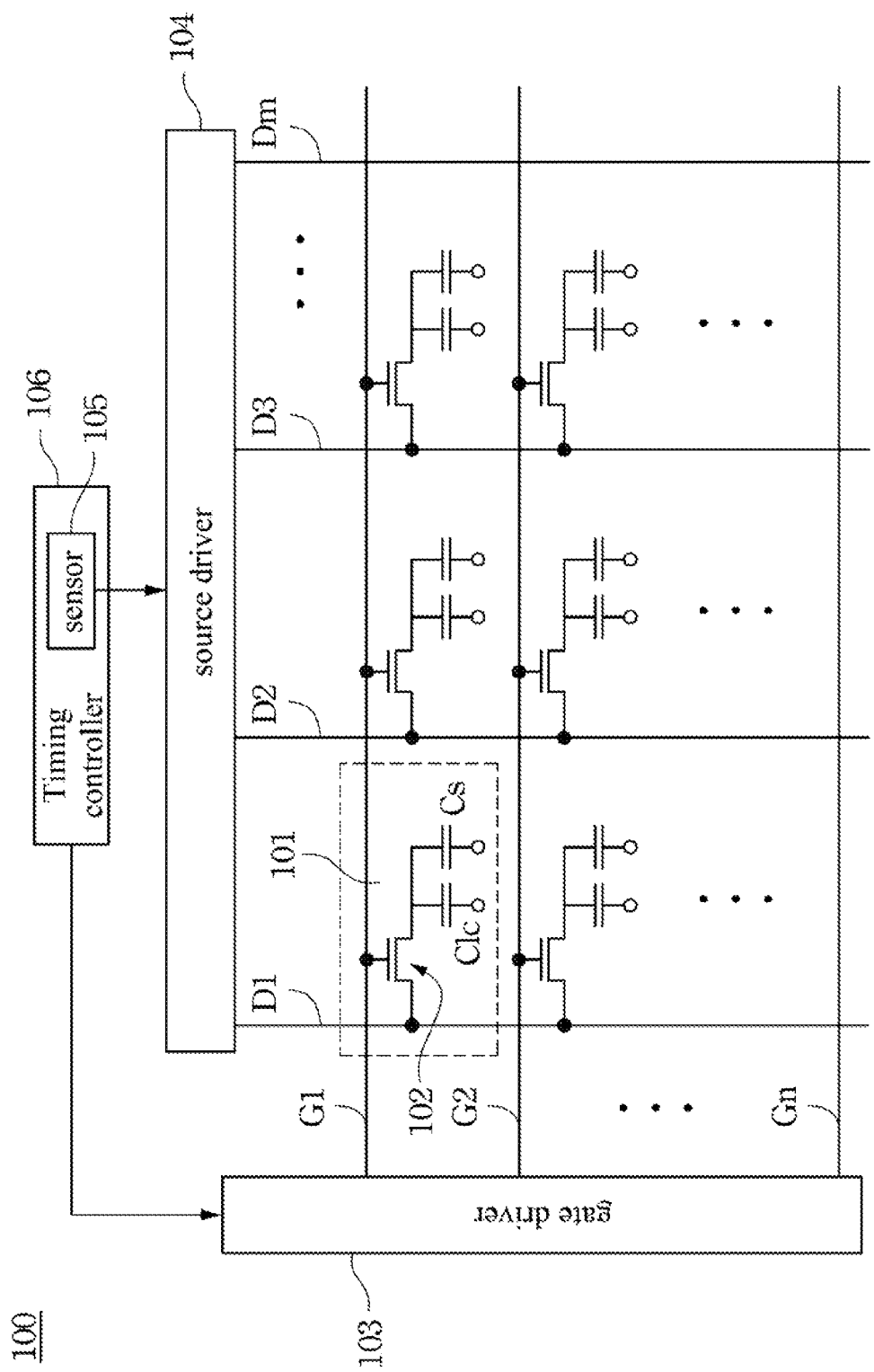
FIG. 1 illustrates a schematic diagram of a pixel matrix for processing a capacitive sensing detection according to a preferred embodiment of the present invention.

Reference will now be made in detail to the present embodiments of the invention, examples of which are illustrated in the accompanying drawings. Wherever possible, the same reference numbers are used in the drawings and the description to refer to the same or like parts.

According to the present invention, a pixel matrix of a display is used as sensing electrodes for processing a capacitive sensing detection. The display is an Organic Light Emitting Display, a thin film transistor liquid crystal display, an Electrode Wetting display, an electrophoretic display, a Microelectromechanical Systems (MEMS) display or an optical mode interference MEMS display. The pixel matrix of this display is configured to be a In Plan Switching (IPS) structure of a Fringe Field Switching (FFS) structure.

FIG. 1 illustrates a schematic diagram of a pixel matrix for processing a capacitive sensing detection according to a preferred embodiment of the present invention. The pixel matrix 100 is an active matrix. The electrode structure of the pixel matrix 100 is disposed on a array substrate. The electrode structure includes a plurality of data lines D1~Dm and a plurality of scan lines G1~Gn. The data lines D1~Dm cross the scan lines G1~Gn. In an embodiment, the data lines D1~Dm and the scan lines G1~Gn have an included angle of 90 degrees. However, in another embodiments, the data lines D1~Dm and the scan lines G1~Gn have included angle, such as 60 degrees, 45 degrees, 36 degrees or 30 degrees. The material for forming data lines D1~Dm and the scan lines G1~Gn is metal, compound metal, Carbon Nanotubes or transparent conductor material, such as ITO, IZO.

Each pair of the scan lines and the data lines controls a pixel. For example, the data line D1 and the scan line G1 controls the pixel 101. Each pixel has same pixel structure, which includes a thin film transistor 102, a storage capacitor Cs and a liquid crystal capacitor Clc formed by a pixel electrode and a common electrode. When an image is displayed by the pixel matrix 100, the gate driver 103 sends scan signal to the scan lines G1~Gn sequentially. When one of the scan lines G1~Gn receives the scan signal, the thin film transistors connected to the scan line are turned on. At this time, the data signal transmitted in the data lines D1~Dn is sent to the pixels through the turned on thin film transistors. Then, a corresponding image is displayed by the pixels. When all scan lines are scanned by the scan signal, a display of a frame is finished. The scan of the scan lines is repeated. Then, a continuous image is displayed. In the present invention, the scan lines G1~Gn and the data lines D1~Dn are used as the sensing matrix to perform the capacitive sensing detection. In other words, there is no additional sensing electrode disposed on the substrate. Therefore, the array substrate may be manufactured using a standard manufacturing process.

On the other hand, a sensor 105 coupling with the source driver 104 and the gate driver 103 to control the gate driver 103 to output the scan signal to the scan lines G1~Gn and control the source driver 104 to output a sensing signal to a selected pixel according to the scan signal for performing a capacitive sensing detection to calculate the touch position and height. The scan signal is a pulse signal. In an embodiment, the sensor 105 is an independent integrated circuit located outside the source driver 104 and gate driver 103. In another embodiment, the sensor 105 is integrated into a timing controller 106 that is located outside the source driver 104 and gate driver 103. In further embodiment, the sensor 105 is integrated into the source driver 104 and gate driver 103.

Accordingly, the present invention provides a capacitive sensing detection method. The method is applied to an active pixel matrix of a display. The method includes to select a first sensing region in the pixel matrix. The first sensing region includes at least one pixel. Then, a first signal is transferred to the first sensing region. A second sensing region is selected. The second sensing region is adjacent to or partial overlapping the first sensing region. Then, a second signal is transferred to the second sensing region. Next, the first signal and the second signal are sensed to calculate their change, so that a touch position or a touch distance is determined. Both the voltages of the first signal and the second signal are less than a threshold voltage of the display.

Figure 2A:
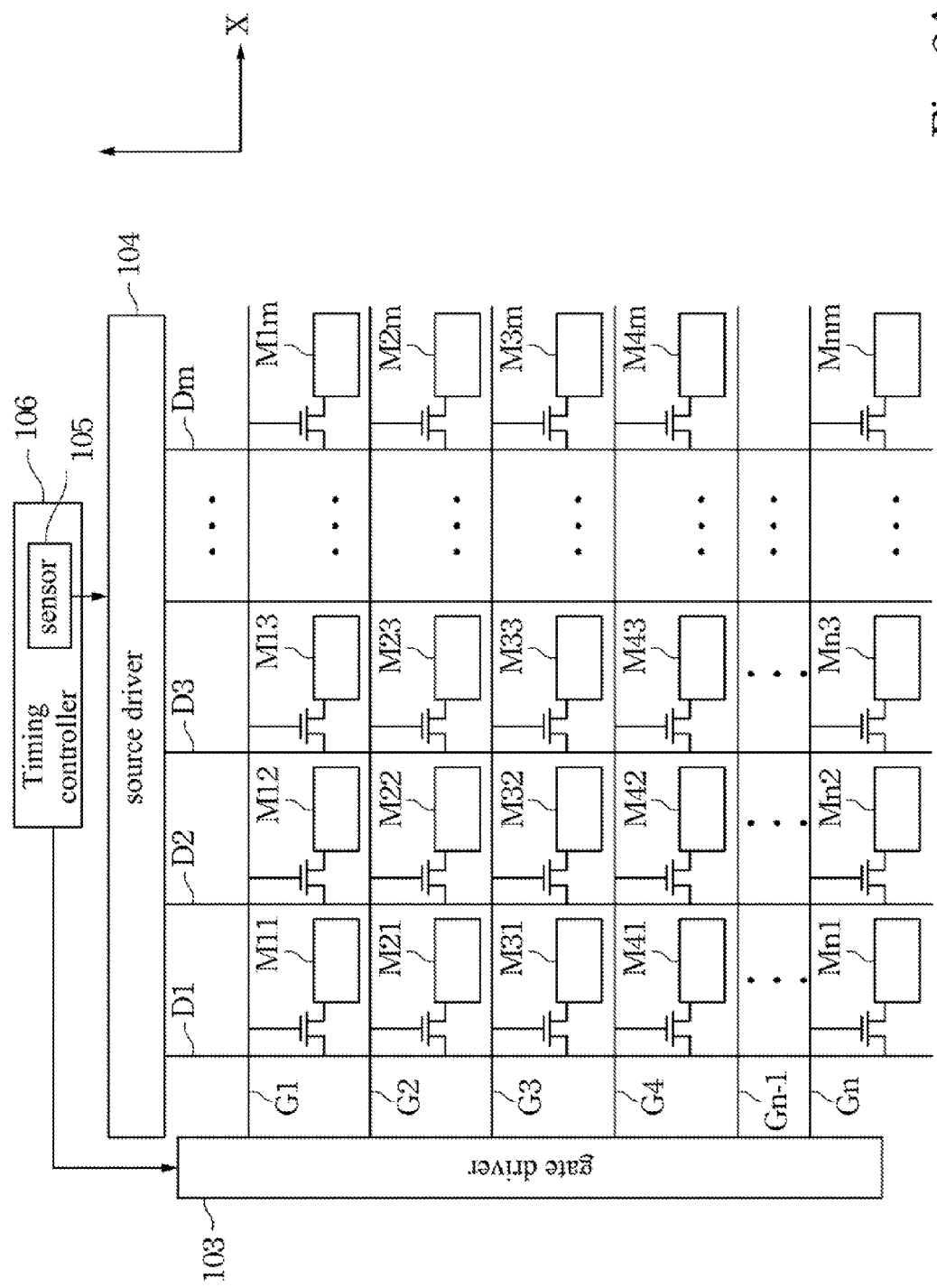
FIG. 2A illustrates a pixel matrix for performing a capacitive sensing detection according to a preferred embodiment of the present invention.

FIG. 2A illustrates a pixel matrix for performing a capacitive sensing detection according to a preferred embodiment of the present invention. The pixel matrix is an active matrix. When the sensor 105 performs a capacitive sensing detection to determine the X-direction position, the sensor 105 controls the gate driver 103 to output a scan signal S1 to the scan line G1 at time t1 to turn on the pixel $M_{11}$~$M_{1m}$ to act as a first sensing region. Accordingly, the first sensing region includes a pixel segment, pixel $M_{11}$~$M_{1m}$. At the same time, the sensor 105 also controls the source driver 104 to output exciting signal, the first signal, to the data lines D1~Dm according to the scan signal S1. The exciting signal is transferred to the turned on pixel $M_{11}$~$M_{1m}$. Next, the sensor 105 controls the gate driver 103 to output a scan signal S2 to the scan line G2 at time t2 to turn on the pixel $M_{21} \sim M_{2m}$ to act as a second sensing region. Accordingly, the second sensing region includes a pixel segment, pixel $M_{21} \sim M_{2m}$. At the same time, the sensor 105 also controls the source driver 104 to sense the turned on pixel $M_{21} \sim M_{2m}$, the second sensing region, through the data lines D1~Dm according to the scan signal S2. The above sensing method is repeated performance. For example, the sensor 105 controls the gate driver 103 to output a scan signal S3 to the scan line G3 at time t3 to turn on the pixel $M_{31} \sim M_{3m}$ to act as a first sensing region. Accordingly, the first sensing region includes a pixel segment, pixel $M_{31} \sim M_{3m}$. At the same time, the sensor 105 also controls the source driver 104 to output exciting signal, the first signal, to the data lines D1~Dm according to the scan signal S3. The exciting signal is transferred to the turned on pixel $M_{31} \sim M_{3m}$. Next, the sensor 105 controls the gate driver 103 to output a scan signal S4 to the scan line G4 at time t4 to turn on the pixel $M_{41} \sim M_{4m}$ to act as a second sensing region. Accordingly, the second sensing region includes a pixel segment, pixel $M_{41} \sim M_{4m}$. At the same time, the sensor 105 controls the source driver 104 to sense the turned on pixel $M_{41} \sim M_{4m}$, the second sensing region, through the data lines D1~Dm according to the scan signal S4. The rest may be deduced by analogy.

In this above embodiment, the second sensing region is adjacent to the first sensing region. That is, the pixels to receive the exciting signal and the pixels to be sensed are alternative arranged. The scan lines G1~Gn are grouped into a first scan lines for selecting the pixels to receive the exciting signal and a second scan lines for selecting the pixels to be sensed. The first scan lines and the second lines are alternative arranged in the array substrate. Accordingly, while the scan lines are sequentially scanned, the source driver 104 may alternative perform sending the exciting signal to the pixels and sensing the pixels to determine the X direction position.

According to the capacitive sensing detection technology, when a finger of a user touches the pixel segment, pixel $M_{21} \sim M_{2m}$ or pixel. $M_{41} \sim M_{4m}$, the charge of the exciting signal sent to the pixel segment is moved from the pixel segment to the finger of the user, which changes the capacitance of the pixel segment. Then, the sensor 105 can sense this capacitance change through the data lines D1~Dm to determine the touch position.

On the other hand, when the sensor 105 performs a capacitive sensing detection to determine the V-direction position, the sensor 105 controls the gate driver 103 to sequentially output scan signals to the scan lines G1~Gn to turn on the pixel $M_{11} \sim M_{n1}$, the first sensing region, at time t1, and controls the source driver 104 to output exciting signal to the pixel $M_{11} \sim M_{n1}$ through the data line D1. Accordingly, the first sensing region includes a pixel segment, pixel $M_{11} \sim M_{n1}$. Next, the sensor 105 controls the gate driver 103 to sequentially output scan signals to the scan lines G1~Gn to turn on the pixel $M_{12} \sim M_{n2}$, the second sensing region, at time t2, and controls the source driver 104 to sense the pixel $M_{12} \sim M_{n2}$ through the data line D2. Accordingly, the second sensing region includes a pixel segment, pixel $M_{12} \sim M_{n2}$, which is adjacent to the pixel $M_{11} \sim M_{n1}$, the first sensing region. The above sensing method is repeated performance. For example, the sensor 105 controls the gate driver 103 to sequentially output scan signals to the scan lines G1~Gn to turn on the pixel $M_{13} \sim M_{n3}$, the first sensing region, at time t3, and controls the source driver 104 to output exciting signal to the pixel $M_{13} \sim M_{n3}$ through the data line D3. Accordingly, the first sensing region includes a pixel segment, pixel $M_{13} \sim M_{n3}$. Next, the sensor 105 controls the gate driver 103 to sequentially output scan signals to the scan lines G1~Gn to turn on the pixel $M_{14} \sim M_{n4}$, the second sensing region, at time t4, and controls the source driver 104 to sense the pixel $M_{14} \sim M_{n4}$, through the data line D4. The rest may be deduced by analogy. Accordingly, the second sensing region includes a pixel segment, pixel $M_{14} \sim M_{n4}$, which is adjacent to the pixel $M_{13} \sim M_{n3}$, the first sensing region.

In this above embodiment, the pixels to receive the exciting signal and the pixels to be sensed are alternative arranged. The data lines D1~Dm are grouped into a first data lines for transferring the exciting signal and a second data lines for sensing the pixels. The first data lines and the second data are alternative arranged in the array substrate. Accordingly, the sensor can know the Y direction position.

It is noticed that the above detection method can be also used to perform a fixed position detection. In an embodiment, the sensor 105 controls the gate driver 103 to output a scan signal S1 to the scan line G1 at time t1 to turn on the pixel $M_{11} \sim M_{1m}$. At the same time, the sensor 105 also controls the source driver 104 to output exciting signal to the data lines D1~Dm according to the scan signal S1. The exciting signal is transferred to the turned on pixel $M_{11} \sim M_{1m}$. Next, the sensor 105 controls the gate driver 103 to output a scan signal S2 to the scan line G2 at time t2 to turn on the pixel $M_{21} \sim M_{2m}$. At the same time, the sensor 105 also controls the source driver 104 to sense the turned on pixel $M_{21} \sim M_{2m}$ through the data lines D1~Dm according to the scan signal S2. Next, the sensor 105 controls the gate driver 103 to output a scan signal S3 to the scan line G3 at time t3 to turn on the pixel $M_{31} \sim M_{3m}$. At the same time, the sensor 105 also controls the source driver 104 to output exciting signal, the first signal, to the data lines D1~Dm according to the scan signal S3. The exciting signal is transferred to the turned on pixel $M_{31} \sim M_{3m}$. Next, the sensor 105 controls the gate driver 103 to output a scan signal S4 to the scan line G4 at time t4 to turn on the pixel $M_{41} \sim M_{4m}$. At the same time, the sensor 105 controls the source driver 104 to sense the turned on pixel $M_{41} \sim M_{4m}$ through the data lines D1~Dm according to the scan signal S4. The rest may be deduced by analogy. For performing a fixed position detection, in this embodiment, the sensor 105 sequentially receives the sensing signal from the data lines D1~Dm For example, at time t2, the sensor 105 controls the source driver 104 to sense the turned on pixel $M_{21} \sim M_{2m}$ through the data lines D1~Dm. Accordingly, when a finger of a user touches a position located between the scan line G1 and the scan line G2, because the sensor sequentially receives the sensing signal from the data lines D1~Dm, the sensor 105 can exactly know which data line sensing signal is changed, so that the exactly position in the x-direction and y direction is determined at the same time.

In a further embodiment, the above detection method can be applied to the whole panel at the same time to determine the touch position. The sensor 105 controls the gate driver 103 to output scan signals to the scan lines G1~Gn at the same time at time t1 to turn on the pixel $M_{11} \sim M_{nm}$. At the same time, the sensor 105 controls the source driver 104 to output exciting signals to the data lines D1~Dm. The exciting signals are transferred to the turned on pixel $M_{11} \sim M_{nm}$. Next, the sensor 105 controls the source driver 104 to sense the turned on pixel $M_{11} \sim M_{nm}$ through the data lines D1~Dm at time t2. Accordingly, when a finger of a user touches a position in the display, the sensor 105 can exactly know which data line sensing signal is changed, so that the position in the x-direction is determined. On the other hand, the above detection method can be also used to determine the y-direction position. Accordingly, an exactly position is got.

Moreover, when a pixel array is used as a touch panel, because the density of the data lines D1~Dm and the scan lines G1~Gn arranged in a array substrate is very high, it causes the capacitance between a plurality of data lines and the scan lines are changed at a same time when a user touch the display. Such case make the sensor difficult to determine the exactly touch position. For resolving the above problem, in an embodiment, a plurality adjacent scan lines are grouped together to be a first scan line group to receive a same scan signal for selection pixels to receive the exciting signal. Moreover, a plurality adjacent scan lines are grouped together to be a second scan line group to receive a same scan signal for selection pixels to sense. That is, while the gate driver 103 sends a scan signal to the first scan line group to turn on the pixels connected with the first scan line group, the source driver 104 sends exciting signals to the turned on pixels. Then, the gate driver 103 sends a scan signal to the second scan line group adjacent to the first scan line group to turn on the pixels connected with the second scan line group, and the source driver 104 senses these turned on pixels to determine a touch position.

In an embodiment, some scan lines in the first scan line group and the second scan line group are scarce. That is, at least one scan line can be arranged in the first scan line group as well as the second scan line group. For example, the scan lines G1~G5 are grouped together to act as the first scan line group and the scan lines G4~G8 are grouped together to act as the second scan line group. Accordingly, the first scan line group and the second scan line group have an overlapping region including the scan lines G4 and G5. However, in another embodiment, two adjacent first scan line groups or two second scan line groups can also have an overlapping region. For example, the scan lines G1~G5 are grouped together to act as the first scan line group and the scan lines G4~G8 are grouped together to act as another first scan line group. Accordingly, the two adjacent first scan line groups have an overlapping region including the scan lines G4 and G5. On the other hand, the scan lines G6~G10 ar9~G13 are grouped together to act as another second scan line group. Accordingly, the two adjacent second scan line groups have an overlapping region including the scan lines G9 and G10. Moreover, in another embodiment, the first scan line group is separated from the second scan line group by at least a scan line. In an embodiment, the width of a finger of a user is used to serve a standard to group the scan lines, such as 2~5 mm that is half of the width of the finger. It is noticed that the above grouping method is used to group the scan lines to determine the X-direction (row-direction) position. However, the same grouping method can be used to group the data lines to determine the Y-direction (column-direction) position.

On the other hand, for preventing the sensing signal be affected by the noise, the scan lines G1~Gn and/or the data lines D1~Dm are connected to a common voltage, such as a grounded voltage, to discharge the scan lines G1~Gn and/or the data lines D1~Dm before the exciting signals are transferred to the scan lines G1~Gn and/or the data lines D1~Dm. In another embodiment, the scan lines G1~Gn and/or the data lines D1~Dm are connected to a common voltage to discharge the scan lines G1~Gn and/or the data lines D1~Dm after the exciting signals are transferred to the scan lines G1~Gn and/or the data lines D1~Dm. Then, the exciting signals are sensed to determine the touch position. In further embodiment, transferring the exciting signals process, sensing the exciting signals process and discharging the scan lines G1~Gn and/or the data lines D1~Dm are processed alternatively. On the other hand, the power lines, the Bias lines, the common electrode lines, the reading lines and the control lines of a display are also used to cooperate with the data lines D1~Dm and the scan lines G1~Gn to finish the capacitive sensing detection.

In another embodiment, the sensor 105 coupling with the source driver 104 and the gate driver 103 to control the gate driver 103 to output the scan signal to the scan lines G1~Gn, wherein the scan signal is a high level voltage. That is, the scan signal make the pixels connected to a same san line be turned on together. The source driver 104 transfers the exciting signal to the turned on pixels at a same time for sensing the touch position. For example, the sensor 105 controls the gate driver 103 to output a high-level scan signal S1 to the scan line G1 at time t1 to turn on the pixel $M_{11}$~$M_{1m}$ at a same time to act as a first sensing region. At the same time, the sensor 105 also controls the source driver 104 to output exciting signal to the data lines D1~Dm according to the scan signal S1. The exciting signal is transferred to the turned on pixel $M_{11}$~$M_{1m}$. Next, the sensor 105 controls the gate driver 103 to output a high-level scan signal S2 to the scan line G2 at time t2 to turn on the pixel $M_{21}$~$M_{2m}$ at a same time to act as a second sensing region. At the same time, the sensor 105 also controls the source driver 104 to sense the turned on pixel $M_{21}$—$M_{2m}$ through the data lines D1~Dm according to the scan signal S2. The above sensing method is repeated performance. For example, the sensor 105 controls the gate driver 103 to output a high-level scan signal S3 to the scan line G3 at time t3 to turn on the pixel $M_{31}$~$M_{3m}$ at a same time to act as a first sensing region. At the same time, the sensor 105 also controls the source driver 104 to output exciting signal at a same time to the data lines D1~Dm according to the scan signal S3. The exciting signal is transferred to the turned on pixel $M_{31}$~$M_{3m}$. Next, the sensor 105 controls the gate driver 103 to output a scan signal S4 to the scan line G4 at time t4 to turn on the pixel $M_{41}$~$M_{4m}$ to act as a second sensing region. At the same time, the sensor 105 controls the source driver 104 to sense the turned on pixel $M_{41}$~$M_{4m}$ through the data lines D1~Dm according to the scan signal S4. The rest may be deduced by analogy. Accordingly, in this embodiment, the scan signal is a high-level voltage. The pixels connected to a same scan line are turned on together. Therefore, transferring the exciting signals process and sensing the exciting signals process are applied to the pixels connected to a same scan at a same time. That increases the sensing velocity.

According to the capacitive sensing detection technology, when a finger of a user touches the pixel segment, pixel $M_{21}$~$M_{2m}$ or pixel $M_{41}$~$M_{4m}$, the charge of the exciting signal sent to the pixel segment, pixel $M_{11}$~$M_{1m}$ or pixel $M_{31}$~$M_{3m}$, is moved to the finger of the user, which changes the capacitance of the pixel segment. Then, the sensor 105 can sense this capacitance change through the data lines D1~Dm to determine the touch position. In another embodiment, the sensor 105 senses the change of this exciting signal through the data lines D1~Dm to determine the touch position. The change of the exciting signal includes the distorted of the exciting signal wave, the change of the average voltage value of the exciting signal, the change of the peak value of the exciting signal or the change of the average current value of the exciting signal. The above method can be also used to determine the Y-direction position.

Moreover, in the above embodiments, the exciting signals are transferred to the pixels, and then, the touch position is determined by sensing the change of the exciting signals in another pixels. In other words, the pixels are the units to determine the touch position. However, in another embodiment, the exciting signals are transferred to the pixels, and then, the touch position is determined by sensing the change of the exciting signals in the data lines (or scan lines). In other words, the pixels and the data lines (or scan lines) are the units to determine the touch position.

For example, the exciting signals are transferred to the pixels, and then, the touch position is determined by sensing the change of the exciting signals in the scan lines. In this embodiment, the sensor 105 controls the gate driver 103 to output scan signal S1 to the scan lines G1~Gn to sequentially turn on the pixel $M_{11}$~$M_{1m}$, the first sensing region, at time t1, and controls the source driver 104 to output exciting signal to the pixel $M_{11}$~$M_{1m}$ through the data lines D1~Dm according to the scan signal S1. Next, the sensor 105 controls the source driver 104 to sense the scan line G2, the second sensing region, at time t2. The above sensing method is repeated performance. For example, the sensor 105 controls the gate driver 103 to output scan signal S3 to the scan lines G1~Gn to sequentially turn on the pixel $M_{31}$~$M_{3m}$, the first sensing region, at time t3, and controls the source driver 104 to output exciting signal to the pixel $M_{31}$~$M_{3m}$ through the data line D1~Dm. Next, the sensor 105 controls the source driver 104 to sense the scan line G4, the second sensing region, at time t4 to determine the X direction (row direction) position. The rest may be deduced by analogy. Accordingly, the pixels for receiving the exciting signals and the scan lines sensed to determine the positions are arranged in alternatively. For example, the pixels connected to the scan lines G1, G3, G5 . . . Gn used to receive the exciting signals and the scan lines G2, G4, G6 . . . Gn~ 1 used to be sensed to determine the positions are arranged in alternatively.

According to the capacitive sensing detection technology, when a finger of a user touches a position surrounded by the scan lines G1~G4, the charges of the exciting signal sent to the pixel segment, pixel $M_{11}$~$M_{1m}$ or pixel $M_{31}$~$M_{3m}$, is moved to the finger of the user, which changes the capacitance of the pixel segment. Then, the sensor 105 can sense this capacitance change through the scan line G2 or G4 to determine the X-direction touch position.

The above method can be also used to determine the Y-direction position. For example, the sensor 105 controls the gate driver 103 to sequentially output scan signal to the scan lines G1~Gn to turn on the pixel $M_{11}$~$Mn_1$, the first sensing region, at time t1, and controls the source driver 104 to output exciting signal to the pixel $M_{11}$~$M_{n1}$ through the data line D1. The scan signal is a pulse signal. Next, the sensor 105 controls the source driver 104 to sense the data line D2, the second sensing region, at time t2. The above sensing method is repeated performance. For example, the sensor 105 controls the gate driver 103 to sequentially output scan signal to the scan lines G1~Gn to turn on the pixel $M_{13}$~$M_{n3}$, the first sensing region, at time t3, and controls the source driver 104 to output exciting signal to the pixel $M_{13}$~$M_{n3}$ through the data line D3. Next, the sensor 105 controls the source driver 104 to sense the data line D4, the second sensing region, at time t4 to determine the Y direction (column direction) position. The rest may be deduced by analogy. Accordingly, the pixels for receiving the exciting signals and the data lines sensed to determine the positions are arranged in alternatively. For example, the pixels connected to the scan lines D1, D3, . . . , Dm used to receive the exciting signals and the data lines D2, D4, . . . , Dm~ 1 used to be sensed to determine the positions are arranged in alternatively.

In another embodiment, the exciting signals are transferred to the scan lines, and then, the touch position is determined by sensing the change of the exciting signals in the pixels. In this embodiment, the sensor 105 controls the gate driver 103 to output an exciting signal to scan line G1 at time t1. Then, the sensor 105 controls the gate driver 103 to output scan signal S2 to the scan line G2 to sequentially turn on the pixel $M_{21}$~$M_{2m}$, at time t2, and controls the source driver 104 to sense pixel $M_{21}$~$M_{2m}$ through the data line D1~Dm according to the scan signal S2. The sensor 105 controls the gate driver 103 to output an exciting signal to scan line G3 at time t3. Then, the sensor 105 controls the gate driver 103 to output scan signal S4 to the scan line G4 to sequentially turn on the pixel $M_{41}$~$M_{4m}$, at time t4, and controls the source driver 104 to sense pixel $M_{41}$~$M_{4m}$ through the data line D1~Dm according to the scan signal S4. The rest may be deduced by analogy. Accordingly, the scan lines for receiving the exciting signals and the pixels sensed to determine the positions are arranged in alternatively. For example, the scan lines G1, G3, G5 . . . Gn used to receive the exciting signals and the pixels connected to the scan lines G2, G4, G6 . . . Gn~ 1 used to be sensed to determine the positions are arranged in alternatively.

According to the capacitive sensing detection technology, when a finger of a user touches a position surrounded by the scan lines G1~G4, the charges of the exciting signal sent to the scan lines G1 or G3 is moved to the finger of the user, which changes the capacitance of the pixel segment. Then, the sensor 105 can sense this capacitance change through the pixels connected to the scan line G2 or G4 to determine the X-direction touch position.

The above method can be also used to determine the Y-direction position. In this embodiment, the sensor 105 controls the source driver 103 to output an exciting signal to data line D1 at time t1. Then, the sensor 105 controls the gate driver 103 to output scan signal to the scan lines G1~Gn to sequentially turn on the pixels $M_{12}$~$M_{n2}$, at time t2, and controls the source driver 104 to sense pixels $M_{12}$~$M_{n2}$ through the data line D2. The sensor 105 controls the source driver 104 to output an exciting signal to data line D3 at time t3. Then, the sensor 105 controls the gate driver 103 to output scan signal to the scan lines G1~Gn to sequentially turn on the pixels $M_{14}$~$M_{n4}$, at time t4, and controls the source driver 104 to sense pixels $M_{14}$~$M_{n4}$ through the data line D4. The rest may be deduced by analogy. Accordingly, the data lines for receiving the exciting signals and the pixels sensed to determine the positions are arranged in alternatively. For example, the data lines D1, D3 . . . , Dm used to receive the exciting signals and the pixels connected to the data lines D2, D4, . . . , Dm~ 1 used to be sensed to determine the positions are arranged in alternatively.

Figure 2B:
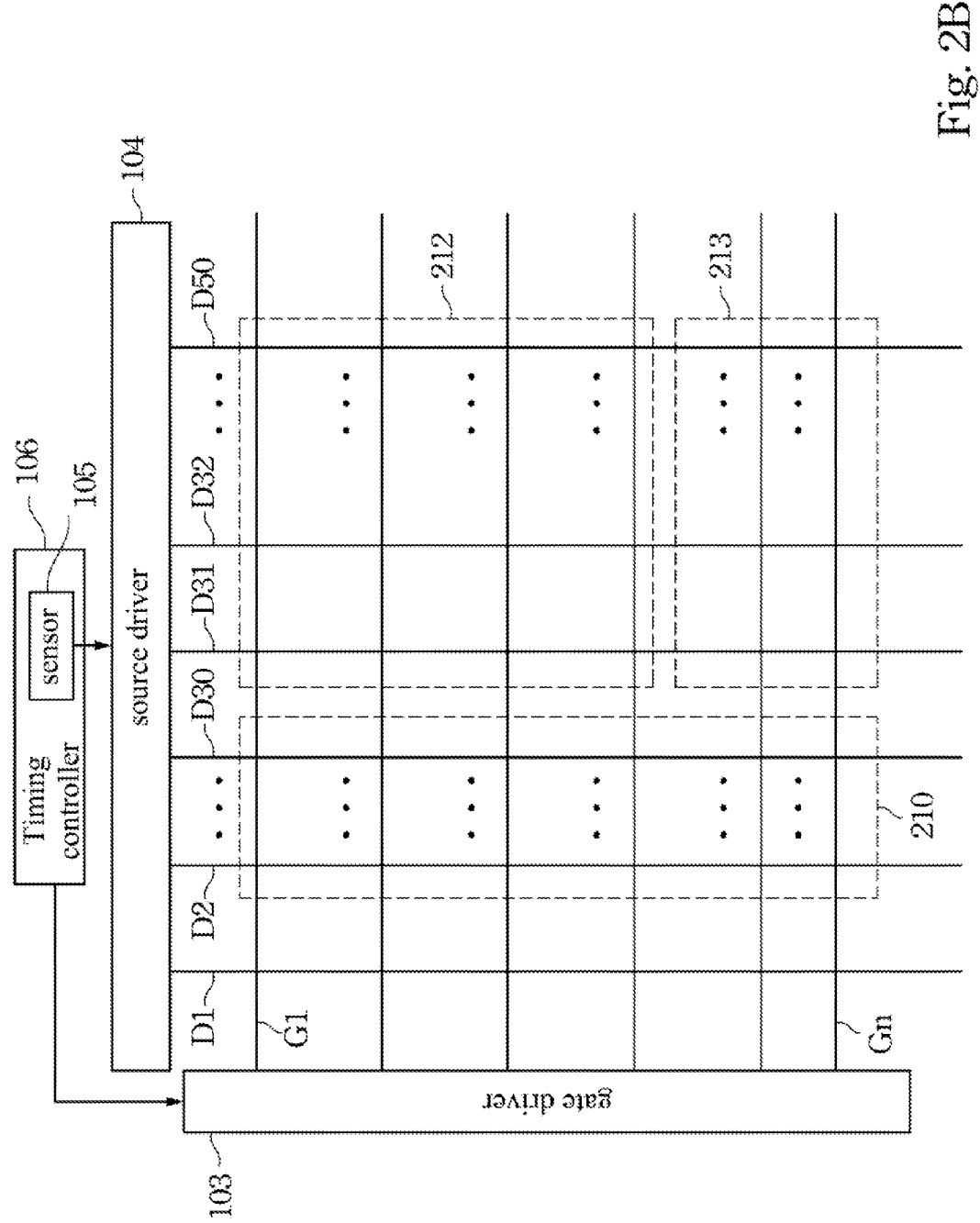
FIG. 2B illustrates a pixel matrix for performing a capacitive sensing detection according to another preferred embodiment of the present invention.

FIG. 2B illustrates a pixel matrix for performing a capacitive sensing detection according to another preferred embodiment of the present invention. In this embodiment, the exciting signals are transferred to a pixel segment, and then, the touch position is determined by sensing the change of the exciting signals in another pixel segment. For example, as shown in FIG. 2b, the exciting signals are transferred to the pixel segment 210 that includes the data lines D1~D30 and the scan lines G1~Gn. Then, the touch position is determined by sensing the change of the exciting signals in the pixel segment 212 that includes the data lines D31~D60 and the scan lines G1~G50. The rest may be deduced by analogy. It is noticed that the size of the pixel segment does not be limited by the above embodiment. For example, in another embodiment, the exciting signals are transferred to the pixel segment 210 that includes the data lines D1~D20 and the scan lines G1~G20. Then, the touch position is determined by sensing the change of the exciting signals in the pixel segment 212 that includes the data lines D21~D30 and the scan lines G1~G40. That is, the size of the pixel segment can be designed according to the users requirement.

Moreover, for preventing the image signal from being interfered because of noise generated while performing position detection, transferring the exciting signal process and sensing the change of the exciting signal to determine the touch position process are performed in the period that the backlight module is turned off. In an embodiment, a frame is divided into two time segments, a first time period and a second time period. In the first time period, the backlight module is turned on to display an image. In the second time period, the backlight module is turned off to perform the capacitive sensing detection to determine the touch position.

Figure 3:
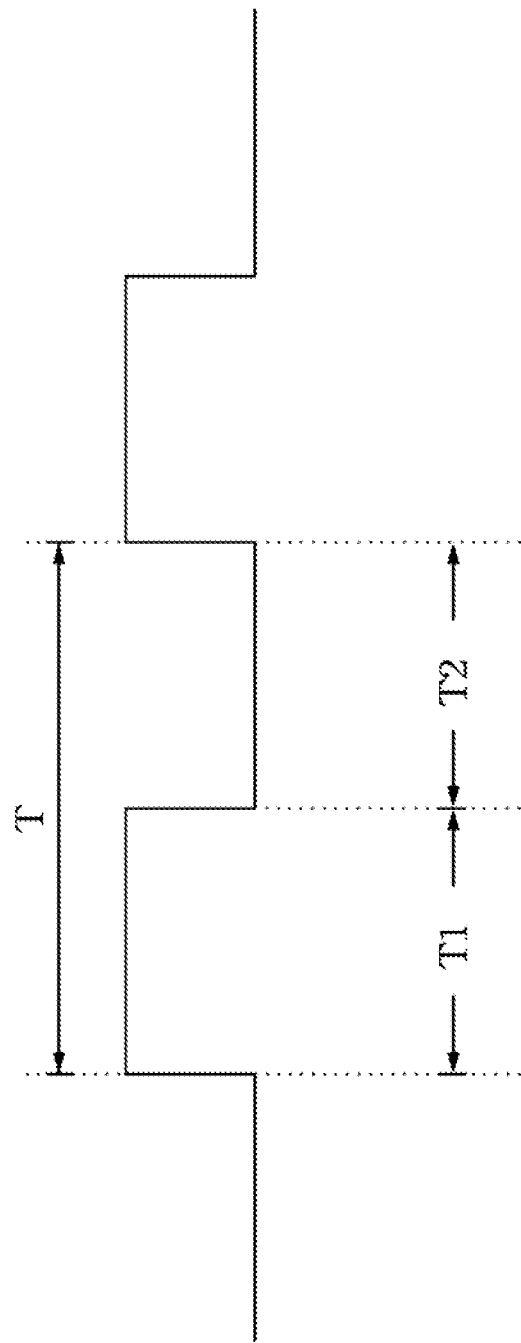
FIG. 3 illustrates a frame that is divided into two time periods, T1 and T2.

FIG. 3 illustrates a frame that is divided into two time periods, T1 and T2. In the first time period T1, the backlight module is lighted to display an image. In the second time period T2, the backlight module is turned off or turned dark to perform the capacitive sensing detection to determine the touch position. Accordingly, the capacitive sensing detection to determine the touch position is performed in the second time period that the backlight module is turned off, which can prevent the image signal from being interfered because of noise generated while performing position detection.

In another embodiment, if the light source is a front light module, transferring the exciting signal process and sensing the change of the exciting signal to determine the touch position process are performed in the period that the front light module is turned off. In a further embodiment, if the display is a self-luminous display, transferring the exciting signal process and sensing the change of the exciting signal to determine the touch position process are performed in the period that display is turned off.

Figure 5:
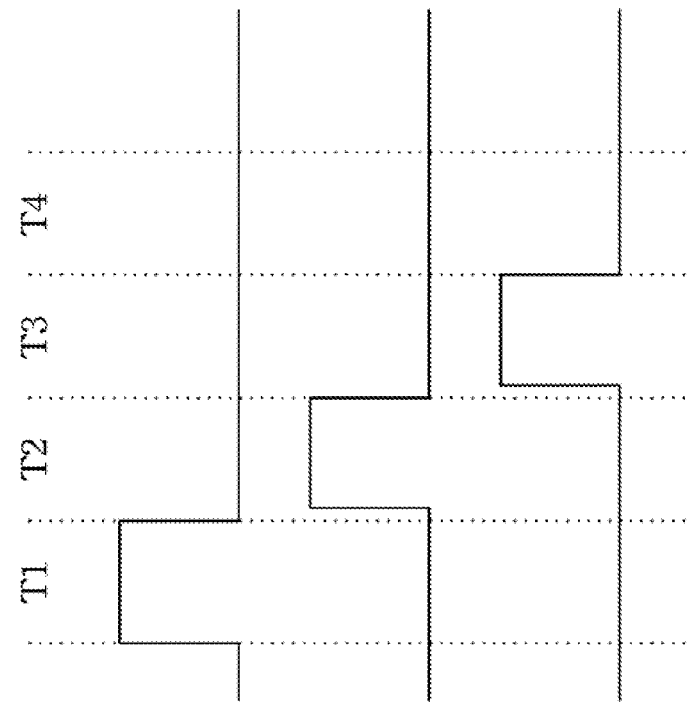
FIG. 5 illustrates a time chart for lighting the backlight module.
Figure 4:
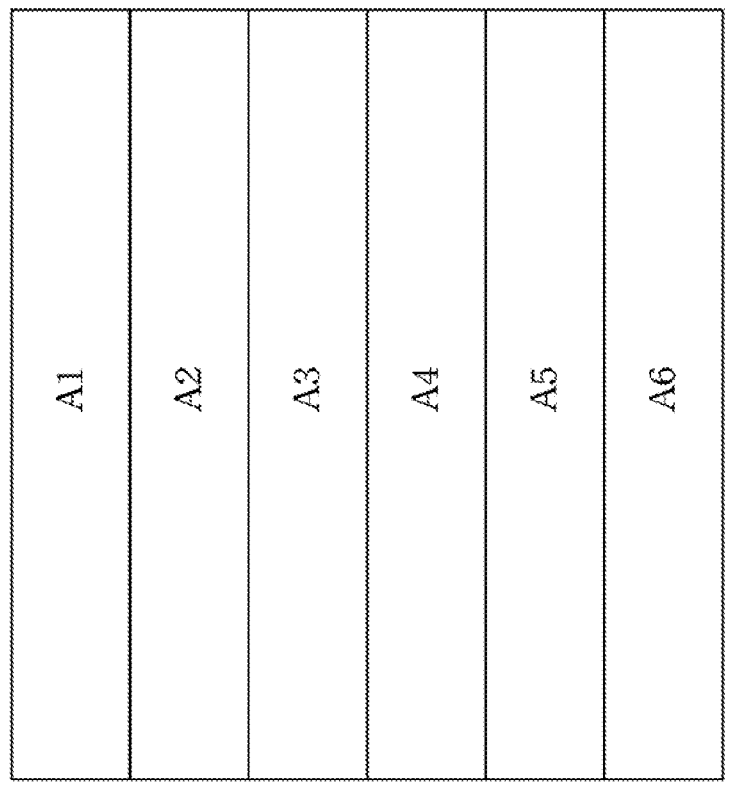
FIG. 4 illustrates a panel that is divided into six regions, region A1, region A2, region A3, region A4, region A5 and region A6.

In another embodiment, the backlight module is switched by regional. FIG. 4 illustrates a panel that is divided into six regions, region A1, region A2, region A3, region A4, region A5 and region A6. In this embodiment, the backlight module is lighted sequentially according to the six regions. FIG. 5 illustrates a time chart for lighting the backlight module. In the first time period T1, the backlight module is lighted to light the region A1 of the display to display an image. In the second time period T2, the backlight module is lighted to light the region A2 of the display to display an image. The rest may be deduced by analogy. Accordingly, when the region A1 is lighted in the first time period, the capacitive touch sensing detection is performed in one of region A2, region A3, region A4, region A5 and region A6. In other words, the capacitive touch sensing detection is performed in a region that is not lighted by the backlight module. In an embodiment, if the region A1, region A2, region A3, region A4, region A5 and region A6 are sequentially lighted by the backlight module, the region A3, region A4, region A5, region A6, region A1 and region A2, or the region A4, region A5, region A6, region A1, region A2 and region A3 are sequentially detected by the capacitive touch sensing detection.

Figure 6:
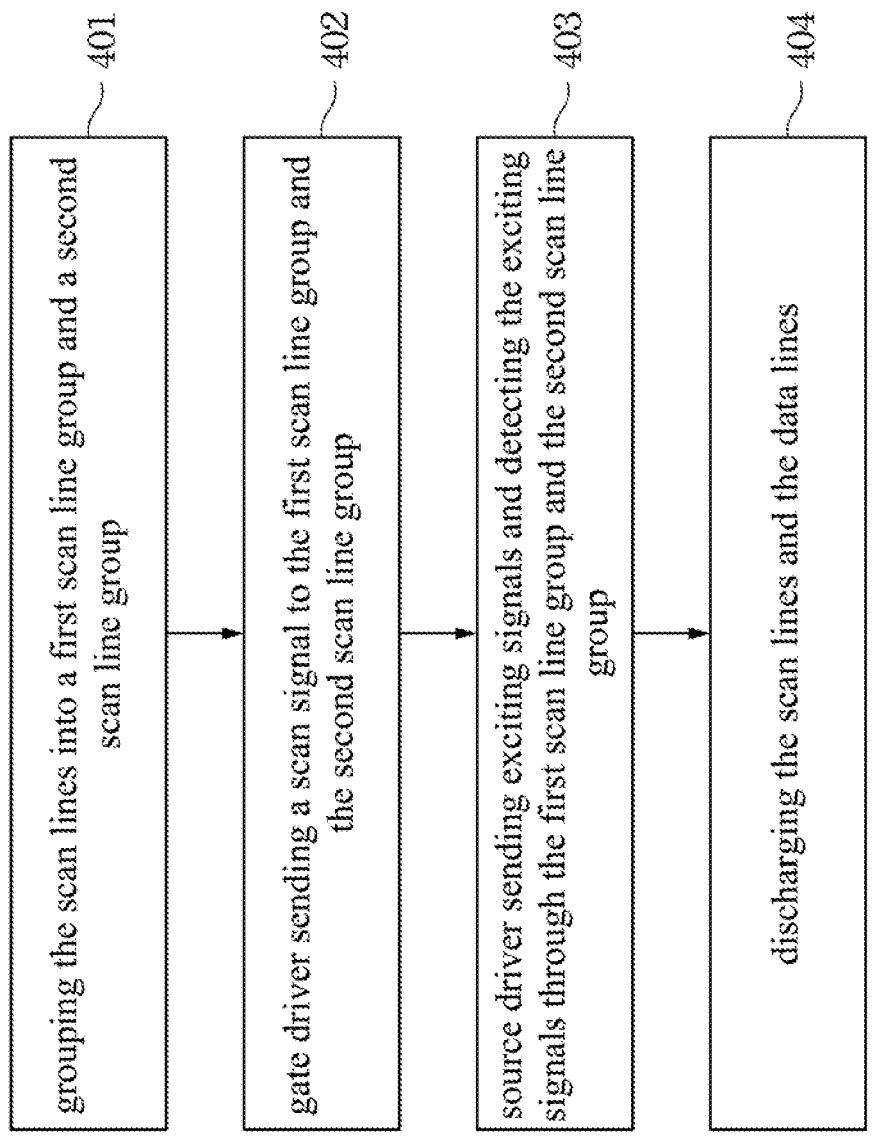
FIG. 6 illustrates a flow chart of using the capacitive touch sensing detection to determine the row direction position according to an embodiment of the present invention.

FIG. 6 illustrates a flow chart of using the capacitive touch sensing detection to determine the row direction position according to an embodiment of the present invention. Please refer to the FIG. 2A and FIG. 6.

In step 401, the scan lines are grouped into a first scan line group and a second scan line group.

In Step 402, the gate driver sends a scan signal to the first scan line group and the second scan line group. In an embodiment, the display panel includes a plurality of data lines D1~Dm and a plurality of scan lines G1~Gn crossing the data lines D1~Dm. The odd numbers of the scan lines G1~Gn are grouped to be the first scan line group. The even numbers of the scan lines G1~Gn are grouped to be the second scan line group. The sensor 105 controls the gate driver 103 to send the scan signal to the first scan line group and the second scan line group. In another embodiment, because the density of the data lines D1~Dm and the scan lines G1~Gn arranged in a array substrate is very high, it causes the capacitance between a plurality of data lines and the scan lines are changed at a same time when a user touches the display. Such case make the sensor 105 difficult to determine the exactly touch position. For resolving the above problem, in an embodiment, a plurality adjacent scan lines are grouped together to be a first scan line group to receive a same scan signal for selection pixels to receive the exciting signal. A plurality adjacent scan lines are grouped together to be a second scan line group to receive a same scan signal for selection pixels to be sensed. In an embodiment, some scan lines in the first scan line group and the second scan line group are same. That is, at least one scan line can be arranged in the first scan line group as well as the second scan line group. Accordingly, the first scan line group and the second scan line group have an overlapping region. Moreover, in another embodiment, the width of a finger of a user is used to serve a standard to group the scan lines, such as 2~5 mm that is half of the width of the finger. On the other hand, the scan signal is a pulse signal or a high-level voltage signal. The display is an Organic Light Emitting Display, a thin film transistor liquid crystal display, an Electrode Wetting display, an electrophoretic display, a Microelectromechanical Systems (MEMS) display or an optical mode interference MEMS display. The pixel matrix of this display is configured to be an In Plan Switching (IPS) structure of a Fringe Field Switching (FFS) structure.

In step 403, the source driver sends exciting signals and to detect the exciting signals through the first scan line group and the second scan line group respectively. In an embodiment, while the gate driver 103 sends scan signal to the first scan line group, the source driver sends exciting signals to the pixels connected to the first scan line group. While the gate driver 103 sends scan signal to the second scan line group, the source driver detects the exciting signals in the pixels connected to the second scan line group to determine the touch position. In another embodiment, while the gate driver 103 sends scan signal to the first scan line group, the source driver sends exciting signals to the pixels connected to the first scan line group. While the gate driver 103 sends scan signal to the second scan line group, the source driver detects the exciting signals in the second scan line group to determine the touch position. In a further embodiment, while the gate driver 103 sends scan signal to the first scan line group, the source driver sends exciting signals to the first scan line group. While the gate driver 103 sends scan signal to the second scan line group, the source driver detects the exciting signals in the pixels connected to the second scan line group to determine the touch position. In a further embodiment, while the gate driver 103 sends scan signal to the first scan line group, the source driver sends exciting signals to the first scan line group. While the gate driver 103 sends scan signal to the second scan line group, the source driver detects the exciting signals in the second scan line group to determine the touch position.

In step 404, the data lines D1~Dm and the scan lines G1~Gn are discharged. In an embodiment, the scan lines G1~Gn and/or the data lines D1~Dm are connected to a common voltage, such as a grounded voltage, to remove charge in the scan lines G1~Gn and/or the data lines D1~Dm to prevent the sensing signal be affected by noise.

Figure 7:
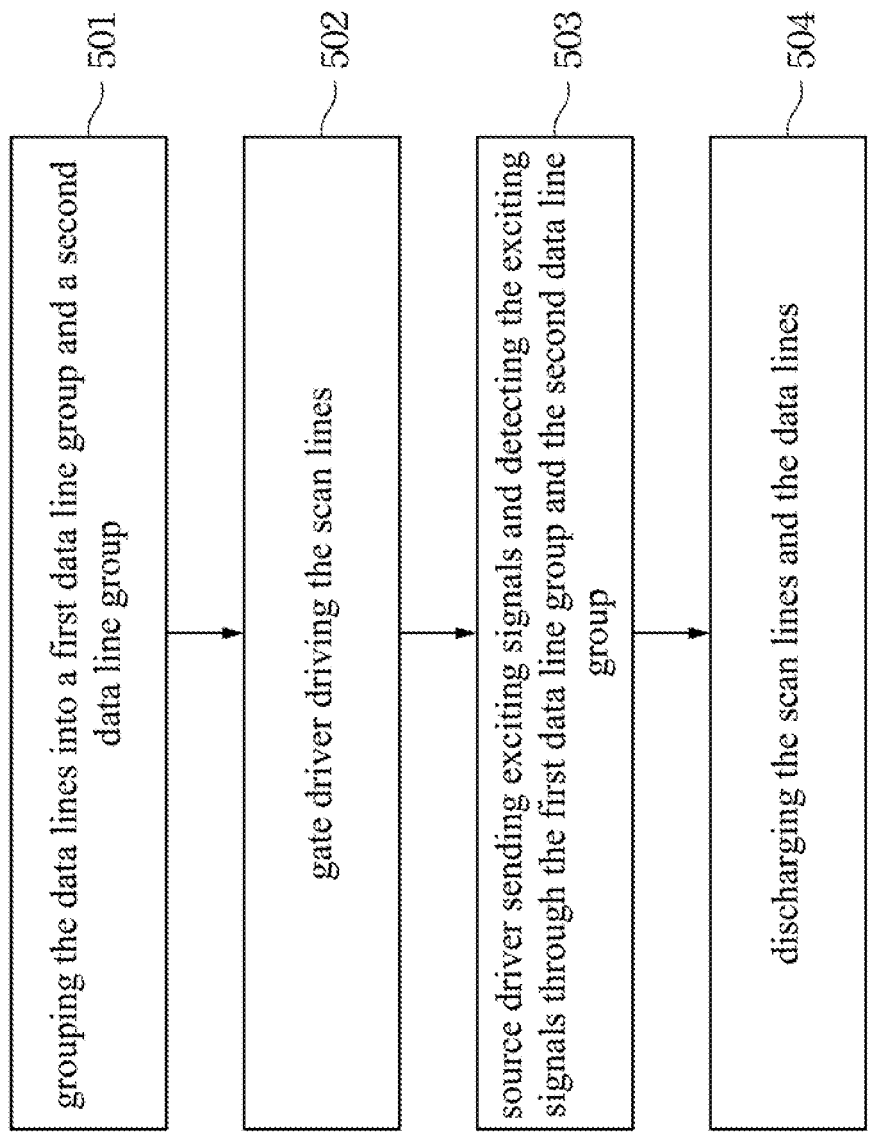
FIG. 7 illustrates a flow chart of using the capacitive touch sensing detection to determine the column direction position according to an embodiment of the present invention.

FIG. 7 illustrates a flow chart of using the capacitive touch sensing detection to determine the column direction position according to an embodiment of the present invention. Please refer to the FIG. 2A and FIG. 7.

In step 501, the data lines are grouped into a first data line group and a second data line group.

In Step 502, the gate driver sends a data signal to the first data line group and the second data line group. In an embodiment, the display panel includes a plurality of data lines D1~Dm and a plurality of data lines G1~Gn crossing the data lines D1~Dm. The odd numbers of the data lines G1~Gn are grouped to be the first data line group. The even numbers of the data lines G1~Gn are grouped to be the second data line group. In another embodiment, because the density of the data lines D1~Dm and the data lines G1~Gn arranged in a array substrate is very high, it causes the capacitance between a plurality of data lines and the data lines are changed at a same time when a user touch the display. Such case make the sensor 105 difficult to determine the exactly touch position. For resolving the above problem, in an embodiment, a plurality adjacent data lines are grouped together to be a first data line to transfer the exciting signal. A plurality adjacent data lines are grouped together to be a second data line group to sense the exciting signals.

In step 503, the source driver through the first data line group and the second data line group to send exciting signals and to detect the exciting signals respectively. In an embodiment, while the gate driver 103 sends scan signal to the gate lines G1~Gn, the source driver sends exciting signals to the pixels connected to the first data line group. While the gate driver 103 sends scan signal to the gate lines G1~Gn, the source driver detects the exciting signals in the pixels connected to the second data line group to determine the touch position. In another embodiment, while the gate driver 103 sends scan signal to the gate lines G1~Gn, the source driver sends exciting signals to the pixels connected to the first data line group. While the gate driver 103 sends scan signal to the gate lines G1~Gn, the source driver detects the exciting signals in the second data line group to determine the touch position. In a further embodiment, while the gate driver 103 sends scan signal to the gate lines G1~Gn, the source driver sends exciting signals to the first data line group. While the gate driver 103 sends scan signal to the gate lines G1~Gn, the source driver detects the exciting signals in the pixels connected to the second data line group to determine the touch position. In a further embodiment, while the gate driver 103 sends scan signal to the gate lines G1~Gn, the source driver sends exciting signals to the first data line group. While the gate driver 103 sends scan signal to the gate lines G1~Gn, the source driver detects the exciting signals in the second data line group to determine the touch position.

In step 504, the data lines D1~Dm and the data lines G1~Gn are discharged. In an embodiment, the data lines G1~Gn and/or the data lines D1~Dm are connected to a common voltage, such as a grounded voltage, to remove charge in the data lines G1~Gn and/or the data lines D1~Dm to prevent the sensing signal be affected by noise.

Accordingly, in the present invention, the scan lines G1~Gn and the data lines D1~Dn are used as the sensing matrix to perform the capacitive sensing detection. In other words, there is no additional sensing panel needed. The thickness of the display is reduced. Moreover, the thin film transistor of the pixel matrix is used to select the sensing electrodes. Therefore, the array substrate may be manufactured using a standard manufacturing process.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A capacitive sensing detection method of an active matrix, wherein a plurality of data arranged in parallel to each other in a first direction cross a plurality of scan lines arranged in parallel to each other in a second direction to form the active pixel matrix, comprising:
   determining a position in the first direction of a touch, further comprising:
   arranging the active pixel matrix into a plurality of first sensing regions and a plurality of second sensing regions, wherein the first sensing regions and the second sensing regions are alternately arranged along the first direction;
   sequentially selecting the first sensing regions and the second sensing regions by the scan lines, wherein when one of the first sensing regions controlled by a first scan line is selected by the first scan line, a first signal is transferred to the one of the first sensing regions through all the data lines, and wherein when one of the second sensing regions controlled by a second scan line is selected by the second scan line, a capacitance of the one of the second sensing regions is sensed through all the data lines; and
   detecting a change of charges on the one of the second sensing regions in response to the first signal to determine the position in the first direction of the touch,
   determining a position in the second direction of the touch, further comprising:
   arranging the active pixel matrix into a plurality of third sensing regions and a plurality of fourth sensing regions, wherein the third sensing regions and the fourth sensing regions are alternately arranged along the second direction;
   sequentially selecting the third sensing regions and the fourth sensing regions by the scan lines, wherein when one of the third sensing regions coupled to a first data line is selected, a second signal is transferred to the one of the third sensing regions through the first data line, and wherein when one of the fourth sensing regions coupled to a second data line is selected, a capacitance of the one of the fourth sensing regions is sensed through the second data line; and
   detecting a change of charges on the one of the fourth sensing regions in response to the second signal to determine the position in the second direction of the touch.

2. The capacitive sensing detection method of claim 1, wherein the first sensing region comprises a pixel, a pixel segment, a conductive line or a plurality of conductive lines.

3. The capacitive sensing detection method of claim 1, wherein the second sensing region comprises a pixel, a pixel segment, a conductive line or a plurality of conductive lines.

4. The capacitive sensing detection method of claim 1, wherein the second sensing region overlaps the first sensing region, or the second sensing region is adjacent the first sensing region, or the second sensing region separates from the first sensing region.

5. The capacitive sensing detection method of claim 1, further comprising transferring a pulse signal or a high-level voltage signal to the first sensing region before transferring a first signal to the first sensing region.

6. The capacitive sensing detection method of claim 1, further comprising transferring a pulse signal or a high-level voltage signal to the second sensing region before sensing the first signal in the second sensing region.

7. The capacitive sensing detection method of claim 1, further comprising discharging the first sensing region before transferring a first signal to the first sensing region.

8. The capacitive sensing detection method of claim 1, further comprising discharging the second sensing region before sensing the first signal in the second sensing region.

9. The capacitive sensing detection method of claim 1, wherein the active pixel matrix is disposed in a display.

10. The capacitive sensing detection method of claim 9, wherein the display is an Organic Light Emitting Display, a thin film transistor liquid crystal display, an Electrode Wetting display, an electrophoretic display, a Microelectromechanical Systems (MEMS) display or an optical mode interference MEMS display.

11. The capacitive sensing detection method of claim 9, wherein the display further comprises a backlight module, wherein the capacitive sensing detection method of claim 1 is performed when the backlight module is turned off.

12. The capacitive sensing detection method of claim 9, wherein the display further comprises a front light module, wherein the capacitive sensing detection method of claim 1 is performed when the front light module is turned off.

13. The capacitive sensing detection method of claim 9, wherein the display further comprises a backlight module, wherein the capacitive sensing detection method of claim 1 is performed in a region of the active pixel matrix that is not lighted by the backlight module.

14. The capacitive sensing detection method of claim 9, wherein the display further comprises a front light module, wherein the capacitive sensing detection method of claim 1 is performed in a region of the active pixel matrix that is not lighted by the front light module.

15. An integrated circuit is disposed in an active pixel matrix for performing the capacitive sensing detection method of claim 1.

* * * * *